United States Patent [19]

Hogenhout

[11] Patent Number: 4,594,036
[45] Date of Patent: Jun. 10, 1986

[54] QUICK CHANGE TOOL CHUCK SYSTEM

[75] Inventor: Franciscus Hogenhout, Redmond, Wash.

[73] Assignee: Kenneth R. Muzzy, Seattle, Wash.

[21] Appl. No.: 496,498

[22] Filed: May 20, 1983

[51] Int. Cl.$^4$ .................................. B23B 31/08
[52] U.S. Cl. ............................ 408/240; 279/65; 279/74; 279/76; 408/226
[58] Field of Search ............... 408/226, 238, 239 R, 408/239 A, 240; 279/1 A, 1 B, 60, 65, 89, 74, 76–80, 82, 81, 54, 55, 56, 57, 58, 59; 145/116 R; 10/140, 141 R, 141 H; 403/378; 81/60, 177.85

[56] References Cited

U.S. PATENT DOCUMENTS

| | | | |
|---|---|---|---|
| 457,889 | 8/1891 | Eberle | 279/60 |
| 914,255 | 3/1909 | Farnham | 279/60 |
| 1,044,029 | 11/1912 | Dabadie | 279/74 X |
| 1,112,349 | 9/1914 | Barnes | 279/74 |
| 1,154,299 | 9/1915 | Farquharson | 279/74 X |
| 1,174,997 | 3/1916 | Lackner | 279/74 |
| 1,233,921 | 7/1917 | Ross | 279/74 |
| 1,372,289 | 4/1921 | Hines | 279/74 |
| 1,425,270 | 8/1922 | Morgan | 279/76 X |
| 1,449,440 | 3/1923 | Plank | 279/74 |
| 1,539,439 | 5/1925 | Smith | 279/74 |
| 1,679,175 | 7/1928 | Schneider et al. | 279/74 |
| 1,686,601 | 10/1928 | Currier | 279/74 |
| 1,856,973 | 5/1932 | Smith | 279/74 |
| 1,862,337 | 6/1932 | Emrick | 408/226 X |
| 2,027,486 | 1/1936 | Lapointe | 279/74 |
| 2,172,070 | 9/1939 | Palmgren | 279/65 X |
| 2,232,494 | 2/1941 | Stieber | 279/74 X |
| 2,386,469 | 10/1945 | Iversen | 279/74 |
| 2,478,382 | 8/1949 | Fischer | 81/128 |
| 2,896,957 | 7/1959 | Vermette | 279/58 |
| 3,589,826 | 6/1971 | Fenn | 408/226 |
| 3,637,225 | 1/1972 | Schmuck | 408/226 X |
| 4,035,100 | 7/1977 | Kruger et al. | 408/226 |
| 4,088,333 | 5/1978 | Nobile et al. | 279/58 X |

FOREIGN PATENT DOCUMENTS 755622 8/1956 United Kingdom ............... 408/226
1222029 2/1971 United Kingdom ............... 408/226

OTHER PUBLICATIONS

Quick Change Adapter System (Model PB-102), Precision Twist Drill Division of PTD, Inc., Crystal Lake, Illinois (1981).

Primary Examiner—Gil Weidenfeld
Assistant Examiner—Glenn L. Webb
Attorney, Agent, or Firm—Graybeal & Cullom

[57] ABSTRACT

A quick change tool chuck system including:
(a) a chuck having: a cylindrical housing member having a lateral aperture for receiving two diametrically opposed jaw members; two jaw members for gripping the shank of a tool, each of the jaw members having an outer surface which is sloped, and each of the jaw members also having an inner surface forming one or more driving surfaces for rotating the shank of a tool and multiple holding surfaces for clamping the shank of the tool; and a cylindrical sleeve member slidably positioned over the housing member, the sleeve member having two diametrically opposed wedge members positioned on the interior surface thereof; and (b) a tool having: a work performing portion; and a round shank connected to the work performing portion, the shank having multiple identical planar surfaces recessed therein, each of the planar surfaces being spaced an equal distance from the crown of the shank, and at least two of the planar surfaces being in contact with at least two of the driving surfaces of the jaw members.

33 Claims, 13 Drawing Figures

QUICK CHANGE TOOL CHUCK SYSTEM

BACKGROUND OF THE INVENTION

(1) Field of the Invention

The invention is in the field of quick change tool chucks and tools therefor.

(2) Description of the Prior Art

The prior art includes many efforts to satisfy the need for a quick change tool chuck. One effort is shown in Emrick U.S. Pat. No. 1,862,337 which discloses a chuck consisting of a tubular chuck body having a lower end portion reduced to form a shoulder upon which a spring seats. The spring operates upon a collar slidable on the reduced portion of the body and carries a tubular housing which encloses the spring and fits upon the enlarged upper end of the body. Coupled with the upper end of the body is a spindle and in the lower end of the body is a tool bit receiving bore. A dog or key member is supported in a radial aperture formed in the reduced extension of the chuck body. The key member has inwardly projecting teeth on its inner surface which extend into the bore to support the tool.

Another prior art effort is shown in Palmgren U.S. Pat. No. 2,172,070 which discloses a chuck in association with a tapering shank which is nonrotatably secured to an elongate adapter having a bore. The sleeve of the chuck provides a housing for the head end of the adapter, the sleeve having a sliding fit with respect thereto which permits rotation of the adapter while the sleeve remains stationary. The adapter provides a shoulder against which a coil spring seats. The coil spring encircles the adapter and is confined within the sleeve by a roller bearing. A tool retaining member is secured axially inside the sleeve. The retaining member is provided with three slots extending lengthwise. The slots receive three triangularly-shaped jaws which clamp the tool bit within the retaining member. The tapering outer edge of each jaw conforms to the tapering inner surface of the adapter. The gripping jaws are forced inwardly by the adapter wall to grip the tool shank. The gripping jaws are provided with an expanding ring which will cause outward movement of the gripping jaws to allow insertion of the tool shank.

Another prior art effort is the commercially-available quick change drill and drill chuck system called the Quick Change Adapter System (Model PB-102) made by the Precision Twist Drill Division of PTD Inc. in Crystal Lake, Illinois. The present invention provides solutions to several problems encountered with that system. First, the tools used in the present invention do not require an adapter to fit in the chuck. The present invention requires only a minor grind on the tool shank. This represents a significant reduction in cost. Second, the present invention eliminates the stocking, storage, and handling problems which are inherent in the prior art design of the adapted drills. And third, in the present invention the tool shank is held positively (clamped securely) in the chuck which eliminates the drill runout caused by the sliding adapted drills in the quick change chuck of that prior art system.

SUMMARY OF THE INVENTION

The invention was developed to fill the long-felt need for a quick change tool chuck system having positive tool drive, quick tool release, automatic adjustment for different tool sizes, and excellent tool concentricity and retention. The invention is intended to replace the prior art quick change adapter system (described above) and the prior art jaw chuck which requires a key and which does not have positive tool drive or quick tool release. The present invention also has the advantage of being suitable for use in robotic machine tool systems.

In one aspect, the invention is a quick change tool chuck which includes:

(a) a cylindrical housing member having a lateral aperture for receiving two diametrically opposed jaw members, the housing member having a central axial aperture for receiving the shank of a tool, the housing member having means for connecting to a power source;

(b) two jaw members for gripping the shank of a tool, the jaw members being diametrically opposed and laterally movable within the housing member, each of the jaw members having an outer surface which is sloped with respect to the axis of rotation of the chuck, each of the jaw members having an inner surface formed by planes which are parallel to the axis of rotation of the chuck, the upper portion of each inner surface comprising one or more planes forming one or more driving surfaces for rotating the shank of a tool, the lower portion of each inner surface comprising multiple intersecting planes forming multiple holding surfaces for clamping the shank of a tool;

(c) spring members positioned to exert lateral force to push apart the jaw members;

(d) a cylindrical sleeve member slidably positioned over the housing member, the sleeve member having two diametrically opposed wedge members positioned on the interior surface thereof, each of the wedge members having an inner surface which is sloped with respect to the axis of rotation of the chuck, the inner surfaces of each wedge member being at least partially in contact with the complementary outer surface of a jaw member; and (e) spring members positioned in the housing member to exert force longitudinally against the wedge members in the sleeve member to push the wedge members against the jaw members.

In another aspect, the invention is a quick change tool chuck system which includes the quick change tool chuck described above in combination with a tool, the tool comprising a work performing portion and a round shank connected to the work performing portion, the shank having a defined portion with multiple identical planar surfaces recessed therein, each of said planar surfaces extending from a lower shoulder to an upper shoulder, said shank being round below said lower shoulders and round above said upper shoulders, the planar surfaces being spaced apart an equal distance from the crown of the tool, at least two of the planar surfaces being in contact with at least two of the multiple driving surfaces of the jaw members.

In yet another aspect, the invention is a set of tools having different shank diameters for use in the quick change tool chuck described above, each tool comprising a work performing portion and a round shank connected to the work performing portion, the shank having a defined portion with multiple planar surfaces recessed therein, each of said planar surfaces extending from a lower shoulder to an upper shoulder, said shank being round below said lower shoulders and round above said upper shoulders, each of the planar surfaces being spaced an equal distance from the crown of the shank.

DESCRIPTION OF THE PREFERRED EMBODIMENTS

There are several preferred embodiments of the invention as will now be described. The first embodiment of the invention may be described by referring in detail to FIGS. 1 and 2.

Figures 1, 2, 2A, 2B:
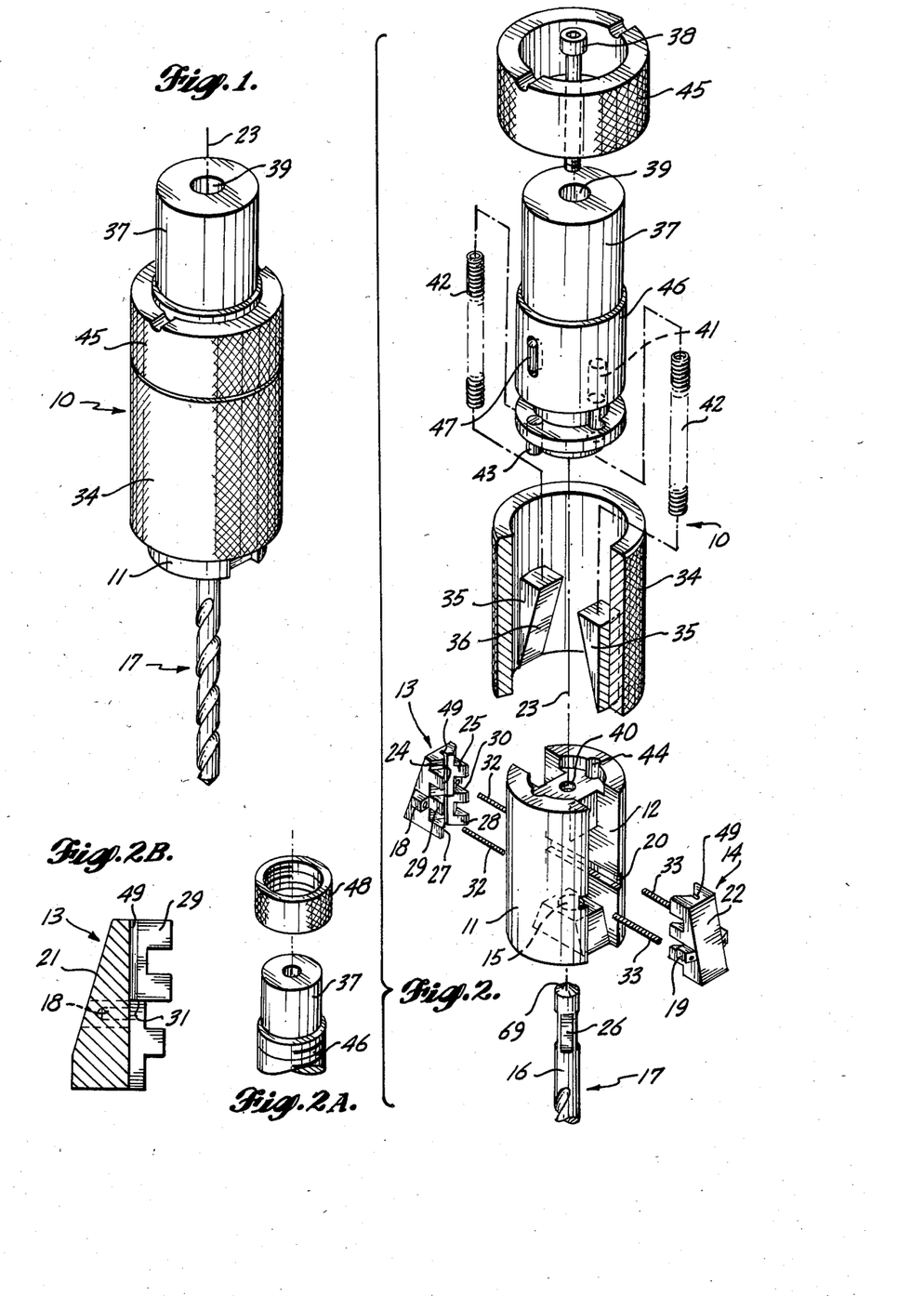
FIG. 1 is a perspective view of one embodiment of a quick change chuck and drill constructed in accordance with the principles of the present invention.
FIG. 2 is an exploded view, partially in section, showing the construction of the chuck and drill shown in FIG. 1.
FIG. 2A is a reduced scale perspective view of an alternative construction of the locking ring.
FIG. 2B is an enlarged scale vertical sectional view taken through the center of the left jaw member.

As shown in FIG. 2, the quick change tool chuck 10 includes a cylindrical housing member 11 having a lateral aperture 12 for receiving the two diametrically opposed jaw members 13 and 14. The housing 11 also has a central axial aperture 15 for receiving the shank 16 of the drill 17.

The two jaws 13 and 14, which clamp and drive the shank 16 of drill 17, fit radially into the central portion of the aperture 12 in the housing 11. The jaws 13 and 14 have wing structures 18 and 19 which ride in the grooves 20 formed in the sides of the housing 11, thus permitting the jaws 13 and 14 to move in and out laterally within the housing 11. The jaws 13 and 14 have outer surfaces 21 and 22 which are sloped with respect to the axis of rotation 23 of the chuck 10. A typical slope may be about 15 degrees. The outer surfaces 21 and 22 may be planar as shown in FIG. 2 or they may be a section of a cylinder.

The jaws 13 and 14 have planar inner surfaces formed by two spaced apart pairs of intersecting planes which are parallel to the axis of rotation 23 of the chuck 10. This structure of the planar inner surfaces may be seen by referring to jaw 13 in FIG. 2. The first pair of intersecting planes form the two planar driving surfaces 24 and 25 in the upper portion of jaw 13. The driving surfaces 24 and 25 contact two complementary planar surfaces 26 in the shank 16 of drill 17. The rotational torque transmitted by the two driving surfaces 24 and 25 through the planar surfaces 26 causes the drill 17 to rotate. The second pair of intersecting planes form two planar holding surfaces 27 and 28 in the lower portion of jaw 13. The holding surfaces 27 and 28 clamp on the round portion (below the planar surfaces 26) of the shank 16. Thus, the jaw members 13 and 14 drive on the square formed by the planar surfaces 26 and clamp on the round portion of shank 16.

The two spaced apart pairs of intersecting planes of each jaw create a stepped right angle groove having two longitudinal rows of teeth 29 and 30. FIG. 2B shows the shoulder or step 31 formed by the two spaced apart pairs of intersecting planes. The step 31 may have typically a height of about 0.0150 inch. Thus, the inner surface of jaws 13 and 14 have a stepped structure consisting of the upper portion formed by the driving surfaces which engage the planar surfaces 26 in the shank 16 and the lower portion formed by the clamping surfaces which clamp the round portion of the shank 16. The two guide rods 32 carry the two compression springs 33 which are positioned laterally between the jaws 13 and 14 to exert a lateral force to push apart the jaws.

As shown in FIG. 2, the jaw members 13 and 14 each have a vertical cut or kerf 49 in the upper portion of the inner surfaces thereof. The purpose of the kerf 49 is to facilitate the manufacture of the right-angle groove and to permit the shank of small diameter tools to fully seat in that groove.

The quick change tool chuck 10 also includes the cylindrical sleeve member 34 which is slidably positioned over the housing member 11. Located on the interior surface of the sleeve 34 are two diametrically opposed wedge members 35 which have the cross-sectional configuration of a right triangle as shown in FIG. 2. The wedge members 35 may be formed as a unit with the sleeve member 34 or they may be separate pieces attached to the interior surface of the sleeve 34 by conventional methods, such as by screws.

Each of the wedge members 35 has an inner surface 36 which is sloped with respect to the axis of rotation 23 of the chuck 10. A typical slope may be about fifteen degrees. The inner surfaces 36 of the wedge members 35 may be planar as shown in FIG. 2 or they may be a section of a cylinder. In either case, the inner surfaces 36 will complement the outer surfaces 21 and 22 of the jaw members 13 and 14. When the sleeve 34 is positioned over the housing 11, the two wedge members 35 fit longitudinally inside the two slot-like longitudinal portions of the aperture 12 in the housing 11, and the inner surfaces 36 at least partially contact the outer surfaces 21 and 22 of the jaw members 13 and 14 as shown in FIGS. 3 and 4.

The quick change tool chuck 10 also includes the cylindrical cap member 37 which fits partially inside the upper portion of the cylindrical sleeve member 34. The cap member 37 is connected to the housing 11 by the assembly bolt 38 which fits inside the central axial aperture 39 in the cap 37 and screws into the threaded aperture 40 in the housing member 11. The central axial aperture 39 is also threaded in its upper portion to receive the spindle from a power source (not shown). On the lower end of the cap 37 is the register pin 43 which fits into one of the registry holes 44 in the upper portion of the housing 11. Inside the cap 37 are two longitudinal apertures 41 which receive the two springs 42. The springs 42 are positioned to exert longitudinal force downward against the shoulders of the wedge members 35 located on the interior surface of the sleeve 34. This in turn causes the sloped inner surfaces 36 of the wedge members 35 to push against the sloped outer surfaces 21 and 22 of the jaw members 13 and 14.

As shown in FIG. 2, the drill 17 has a round shank 16 having an upper portion with four identical flat or planar surfaces 26 recessed therein. The planar surfaces 26 may be formed in the shank 16 by conventional methods, such as by grinding. The purpose of the planar surfaces 26 is to provide complementary surfaces for the planar driving surfaces formed in the jaw members 13 and 14. A typical tool shank for purposes of this invention may have a diameter of about 0.090 to 0.253 inch and may have the planar surfaces recessed in the shank 16 at a depth of about 0.0140 to 0.0145 inch. For purposes of illustration, the drawings show a twist drill, but it should be understood that other types of tools may also be employed such as taps, screwdrivers, end mills, routers, socket wrenches, reamers, gun drills, small grinding wheels, deburring tools, and the like.

Figure 3:
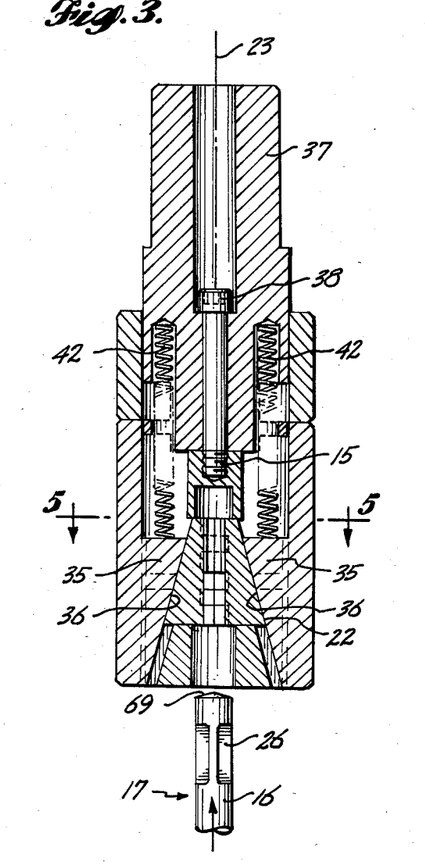
FIG. 3 is a vertical sectional view of the chuck shown in FIG. 1 with the drill removed therefrom.
Figure 4:
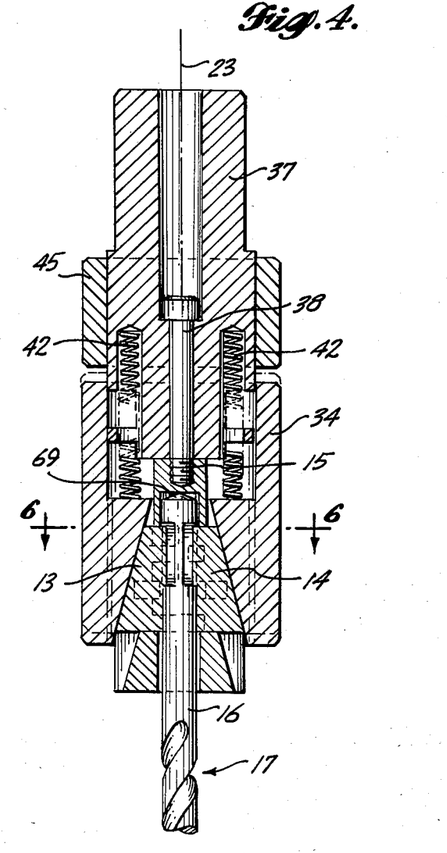
FIG. 4 is a vertical sectional view of the chuck shown in FIG. 1 with the drill fully seated therein.
Figure 5:
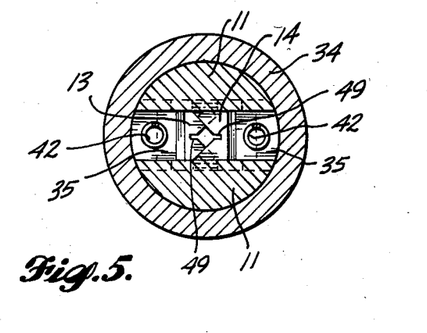
FIG. 5 is a horizontal cross-sectional view taken along line 5—5 in FIG. 3.
Figure 6:
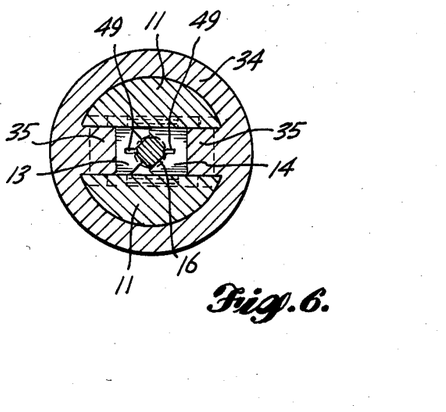
FIG. 6 is a horizontal cross-sectional view taken along line 6—6 of FIG. 4.

FIGS. 3 and 5 show that the teeth of the jaws 13 and 14 mesh together when no drill is inserted in the chuck 10. FIGS. 4 and 6 show how the jaws 13 and 14 spread apart when the drill 17 is inserted in the chuck 10. FIG. 6 shows the square formed by the planar driving surfaces of the jaws 13 and 14 which drive on the square formed by the planar surfaces 26 in the shank 16.

To assemble the chuck 10, the jaw members 13 and 14 are placed in the housing 11 riding in the grooves 20 with the springs 33 in proper alignment as shown in FIG. 2. Holding the jaws 13 and 14 firmly in place in the closed position, the sleeve 34 is placed over the housing 11. The two wedge members 35 will now hold the jaws 13 and 14 in place. The cap member 37 is subsequently installed in place on top of the housing 11 with the springs 42 in their respective apertures 41.

To insert the drill 17 into the chuck 10, the operator simply lifts upwardly the sleeve 34. As a result of lifting the sleeve 34, the wedge members 35 permit the jaws 13 and 14 to spread apart under the action of springs 33 and open in order to accept the shank 16 of the drill 17. The shank 16 is then inserted into the aperture 15 all the way until the crown 69 bottoms in the upper portion of the housing 11. Then the sleeve 34 is let down by the action of compression springs 41 which provide enough force to ensure proper locking of the jaws 13 and 14 onto the shank 16 by virtue of the sloped inner surfaces 36 of the wedge members 35 acting against the sloped outer surfaces 21 and 22 of the jaws 13 and 14.

An important advantage of the present invention is that the vertical thrust of the drill 17 is taken on the end or crown 69 of the shank 16 which is in contact with the upper portion of the housing 11 as shown in FIG. 4. In the prior art jaw chuck, the thrust is taken by the jaws whereas in the present invention the thrust is taken by the housing 11. Another advantage of the present invention is that the tool is clamped on the round portion of the shank 16 before the planar surfaces 26 contact the driving surfaces 24 and 25. This is important in order to reliably achieve concentricity of the tool in the chuck 10.

An alternative design of the jaws 13 and 14 may be used. The alternative design is similar to that described above except the upper portion of the planar inner surface may be formed by a single plane which is parallel to the axis of rotation of the chuck 10. The single plane forms a single planar driving surface in the upper portion of each jaw. The single driving surface contacts a single complementary planar surface 26 formed in the shank 16 of drill 17. The rotational force transmitted by the driving surface through the planar surface 26 causes the drill 17 to rotate. In this alternative design, the lower portion of each jaw is the same as that described above, i.e., formed by a pair of intersecting planes which form two planar holding surfaces the same as holding surfaces 27 and 28 described above. The holding surfaces clamp on the round portion of the shank 16 below the planar surfaces 26. Thus, in the alternative design, the functional relationships are the same in that the jaw members drive on the flat portion formed by the planar surfaces 26 and clamp on the round portion of shank 16.

Although FIGS. 1 and 2 show the circular locking ring 45, the first embodiment of the invention is intended to operate at low rotational speeds which do not require the locking ring 45, which prevents upward movement of the sleeve 34. Thus, it should be understood that the first embodiment of the invention does not include the locking ring 45. At high rotational speeds, the sleeve 34 tends to move upward because of the resistance of the material being worked causing a reverse torque on the tool shank which tries to rotate in the jaws 13 and 14 and force the jaws to spread apart. Thus, a locking mechanism to prevent such unintended upward movement of the sleeve 34 becomes important at high rotational speeds.

Accordingly, the second embodiment of the invention includes the circular locking ring 45 as shown in FIGS. 1 and 2. The locking ring 45 fits on and around the lower stem portion 46 of the cylindrical cap member 37 which has a slightly larger diameter than the upper stem portion of the cap member 37 as shown in FIG. 2. The locking ring 45 rotates on two wedge rollers 47 which are partially recessed and diametrically opposed on opposite sides of the cap member 37. The smooth bore of the locking ring 45 is slightly elliptical; thus when the locking ring 45 is rotated it jams against the wedge rollers 47. This serves to lock the locking ring 45 in place which in turn prevents any upward movement of the sleeve 34. As explained above, the purpose of the locking ring 45 is to prevent any upward movement of the sleeve 34 during operation of the chuck 10 at high rotational speeds.

To insert a tool into the second embodiment of the tool chuck 10, the operator simply turns the locking ring 45 to its unlocked position and then lifts upwardly the sleeve 34. The remainder of the procedure is as described above for the first embodiment.

The third embodiment of the invention may be described by referring to FIG. 2A, wherein the locking ring 48 has a threaded circular bore. In this embodiment, the lower portion 46 of the cap member 37 is threaded in order to receive the threaded locking ring 48 and the wedge rollers 47 are omitted. In other details, the third embodiment is the same as the second embodiment described above.

Figures 7, 8:
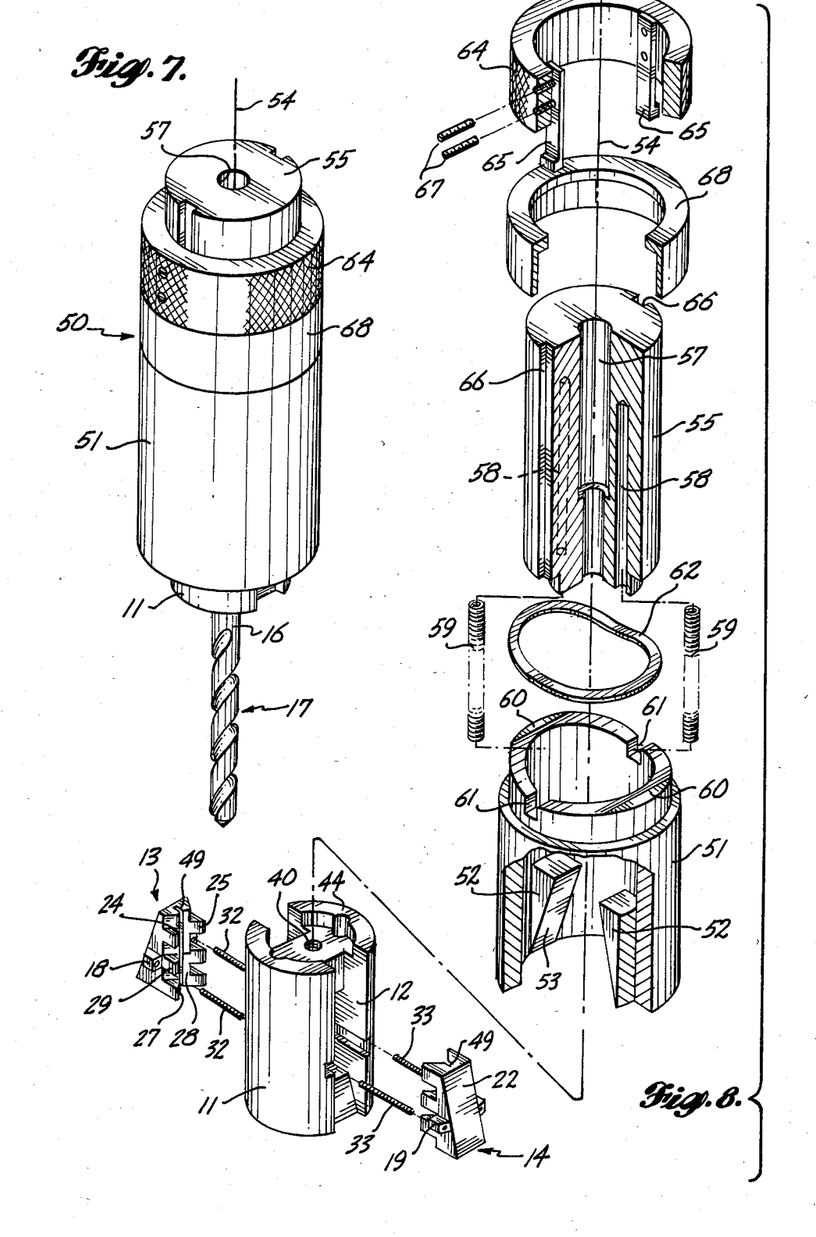
FIG. 7 is a perspective view of another embodiment of a chuck and drill constructed in accordance with the principles of the present invention.
FIG. 8 is an exploded view, partially in section showing the construction of the chuck shown in FIG. 7.

The fourth embodiment of the invention may be described by referring in detail to FIGS. 7 and 8. Many parts of the quick change tool chuck 50 (the fourth embodiment) are the same as in the first embodiment shown in FIG. 2 and those like parts bear the same reference numerals as in FIG. 2. The parts which are different will now be described.

As shown in FIG. 8, the cylindrical sleeve member 51 is slidably positioned over the housing member 11. Located on the interior surface of the sleeve 51 are two diametrically opposed wedge members 52 which have the cross-sectional configuration of a right triangle as shown in FIG. 8. The wedge members 52 may be formed as a unit with the sleeve member 51 or they may be separate pieces attached to the interior surface of the sleeve 51 by conventional methods, such as by screws.

Each of the wedge members 52 has an inner surface 53 which is sloped with respect to the axis of rotation 54 of the chuck 50. The inner surfaces 53 of the wedge members 52 may be planar as shown in FIG. 8, or they may be a section of a cylinder. In either case, the inner surfaces 53 should complement the outer surfaces 21 and 22 of the jaw members 13 and 14. When the sleeve 51 is slidably positioned over the housing 11, the two wedge members 52 fit longitudinally inside the two slot-like longitudinal portions in the aperture 12 of the housing 11 so that the inner surfaces 53 contact the outer surfaces 21 and 22 of the jaw members 13 and 14.

The quick change tool chuck 50 also includes the cylindrical cap member 55 which fits partially inside the upper portion of the cylindrical sleeve member 51. The cap member 55 is connected to the housing 11 by an assembly bolt (not shown in FIG. 8 but similar to bolt 38 in FIG. 2) which fits inside the central axial aperture 57 of the cap 55 and screws into the threaded aperture 40 in the housing member 11. The central axial aperture 57 is also threaded in its upper portion to receive the spindle from a power source (not shown). On the lower end of the cap 55 is a register pin (not shown) which fits into one of the registry holes 44 in the upper portion of the housing 11. Inside the cap 55 are two longitudinal apertures 58 which receive the two springs 59. The springs 59 are positioned to exert longitudinal force downward against the shoulders of the wedge members 52 located on the interior surface of the sleeve 51. This in turn causes the sloped inner surfaces 53 of the wedge members 52 to push against the sloped outer surfaces 21 and 22 of the jaw members 13 and 14.

The two uppermost edges 60 of the upper wall of the sleeve 51 are flat while the remainder of the upper edge of the wall slants downwardly and inwardly and has two notches 61 formed therein. The downwardly curved locking ring 62 sits on the flat upper edges 60 of the sleeve 51. The locking ring 62 fits on and around the cylindrical stem of the cap member 55 and normally binds on the stem of the cap member 55. The locking ring 62 is a thin hardened steel ring or washer which has been struck on a die which is a section of a cylinder in order to provide it with a permanent downward curvature as shown in FIG. 8. The downward curvature of the locking ring 62 makes its bore have a nominally elliptical shape. The locking ring 62 is deformable, or bendable, to the extent that it can be flexed to flatten out so that its bore assumes a substantially circular shape. Thus, when the locking ring 62 is at rest, curved downwardly, its bore is slightly elliptical and it binds on the stem of cylindrical cap member 55. Accordingly, it prevents any unintended upward movement of the sleeve member 51 which would open the jaws 13 and 14. When the locking ring 62 is flattened out its bore is substantially circular and it slides freely on the stem of cylindrical cap member 55.

Above the locking ring 62 is the lifting ring 64 which is slidably positioned on and around the cap member 55. The two fingers 65 fit into the longitudinal grooves 66 formed in the exterior surface of the cap member 55. The fingers 65 are attached to the lifting ring 64 by the screws 67. When the lifting ring 64 is moved upwardly, the fingers 65 pull upwardly on the opposed portions of the locking ring 62 which in turn causes it to flatten out and unlock from the cap member 55.

The skirt ring 68 is located below the lifting ring 64 and is press fitted into position on the upper portion of the sleeve member 51. The function of skirt ring 68 is to conceal the locking ring 62 and the fingers 65 and to hold the locking ring 62 in place.

To insert the drill 17 into the chuck 50, the operator simply lifts upwardly the lifting ring 64. As a result of lifting of the lifting ring 64, the locking ring 62 unlocks from the cap member 55 which thereby permits the operator to lift upwardly the sleeve 51. As a result of lifting the sleeve 51, the wedge members 52 permit the jaws 13 and 14 to spread apart and open in order to accept the shank 16 of the drill 17. The shank 16 is then inserted into the aperture 15 all the way until it bottoms in the upper portion of the housing 11. Then the sleeve 51 is let down by the springs 59 which provide enough force to ensure proper locking of the jaws 13 and 14 onto the shank 16 by virtue of the sloped inner surfaces 53 of the wedge members 52 acting against the sloped outer surfaces 21 and 22 of the jaws 13 and 14. The operator then lowers the lifting ring 64 which causes the locking ring 62 to resume a downward curvature which binds onto the cap member 55 thereby preventing any upward movement of the sleeve 51.

Figures 9, 9A, 9B:
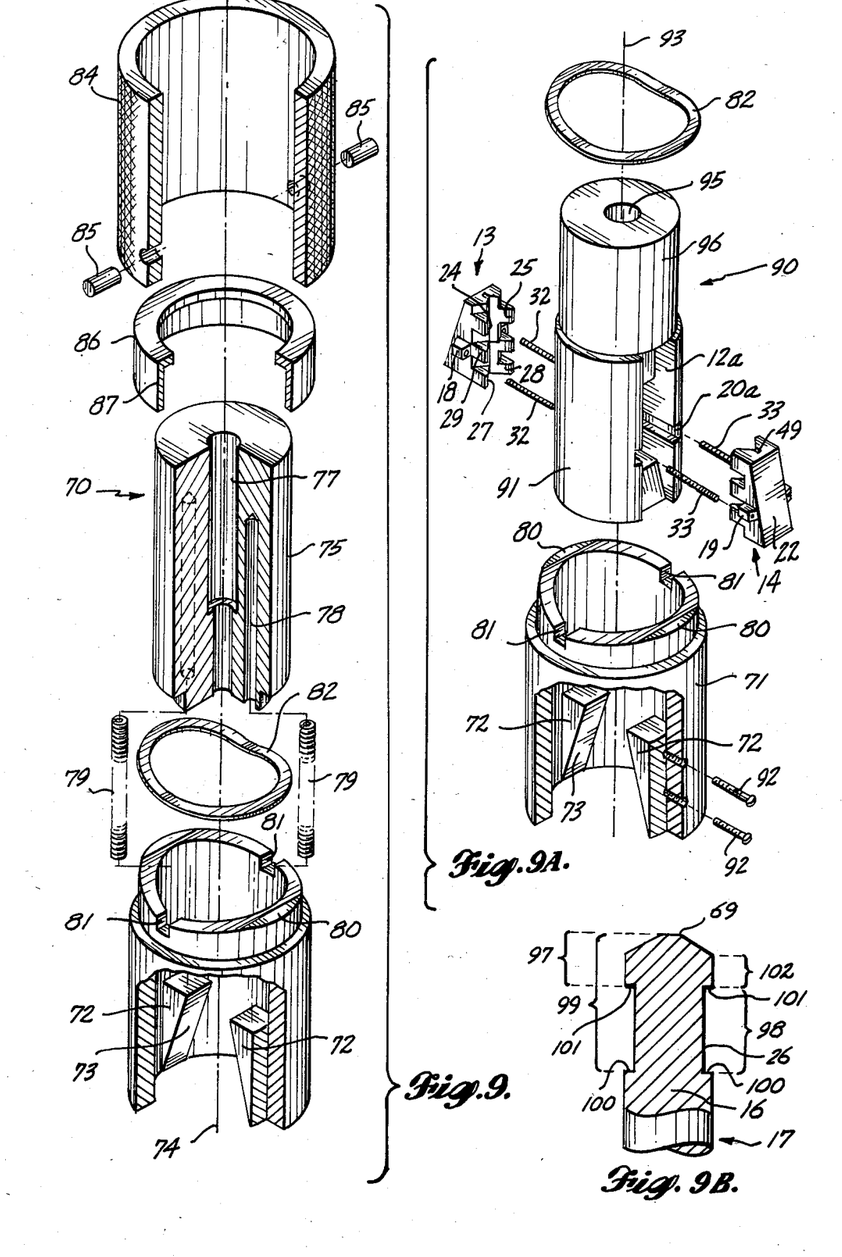
FIG. 9 is an exploded view, partially in section, of another embodiment of a chuck constructed in accordance with the principles of the present invention.
FIG. 9A is an exploded view, partially in section, showing another embodiment of a chuck constructed in accordance with the principles of the present invention.
FIG. 9B is an enlarged vertical sectional view taken along the central axis of the shank of a tool for use in the quick change tool chuck.

The fifth embodiment of the invention may be described by referring in detail to FIG. 9. Some parts of the quick change tool chuck 70 (the fifth embodiment) are the same as in the first embodiment shown in FIG. 2. The parts which are the same as in FIG. 2 are not shown for simplicity. Accordingly, the cylindrical housing member 11 and the two jaw members 13 and 14 and associated parts thereto are not shown in FIG. 9 because those parts are the same as in FIG. 2. The parts which are different will now be described.

The cylindrical sleeve member 71 shown in FIG. 9, is slidably positioned over the housing member 11 (shown in FIG. 2). Located on the interior surface of the sleeve 71 are two diametrically opposed wedge members 72 which have the cross-sectional configuration of a right triangle as shown in FIG. 9. The wedge members 72 may be formed as a unit with the sleeve 71 or they may be separate pieces attached to the interior surface of the sleeve 71 by conventional methods, such as by screws.

Each of the wedge members 72 has an inner surface 73 which is sloped with respect to the axis of rotation 74 of the chuck 70. The inner surfaces 73 of the wedge members 72 may be planar as shown in FIG. 9, or they may be a section of a cylinder. In either case, the inner surfaces 73 should complement the outer surfaces 21 and 22 of the jaw members 13 and 14 (shown in FIG. 2). When the sleeve 71 is slidably positioned over the housing 11, the two wedge members 72 fit longitudinally inside the two slot-like longitudinal portions in the aperture 12 of the housing 11 so that the inner surfaces 73 contact the outer surfaces 21 and 22 of the jaw members 13 and 14.

The quick change tool chuck 70 also includes the cylindrical cap member 75 which fits partially inside the upper portion of the cylindrical sleeve member 71. The cap member 75 is connected to the housing 11 by an assembly bolt (not shown in FIG. 9 but similar to bolt 38 shown in FIG. 2) which fits inside the central axial aperture 77 of the cap 75 and screws into the threaded aperture 40 in the housing member 11. The central axial aperture 77 is also threaded in its upper portion to receive the spindle from a power source (not shown). On the lower end of the cap member 75 is a register pin (not shown in FIG. 9) which fits into one of the registry holes 44 in the upper portion of the housing 11. Inside the cap member 75 are two longitudinal apertures 78 which receive the two springs 79. The springs 79 are positioned to exert force longitudinally downward against the shoulders of the wedge members 72 located on the interior surface of the sleeve 71. This in turn causes the sloped inner surfaces 73 of the wedge member 72 to push against the sloped outer surfaces 21 and 22 of the jaw members 13 and 14.

The two uppermost edges 80 of the upper wall of the sleeve member 71 are flat while the remainder of the upper edge of the wall slants downwardly and inwardly and has two notches 81 formed therein. The downwardly curved locking ring 82 sits on the flat upper edges 80 of the sleeve member 71. The locking ring 82 also fits on and around the stem of the cylindrical cap member 75 and normally binds on the stem of the cap member 75. The locking ring 82 is a thin, hardened steel ring or washer which has been struck on a die which is a section of a cylinder in order to make it have a permanent downward curvature as shown in FIG. 9. The downward curvature of the locking ring 82 makes its bore have a nominally elliptical shape. The locking ring 82 is deformable, or bendable, to the extent that it can be flexed to flatten out so that its bore assumes a circular shape. Thus, when the locking ring 82 is at rest, curved downwardly, its bore is slightly elliptical and it binds on the stem of cylindrical cap member 75. Accordingly, it prevents any unintended upward movement of the sleeve member 71 which would open the jaws 13 and 14. When the locking ring 82 is flattened out, its bore is substantially circular and it slides freely on the stem of cylindrical cap member 75.

The skirt ring 86 is located over and around the locking ring 82 and is press fitted into position on the upper portion of the sleeve member 71. The function of the skirt ring 86 is to conceal and hold the locking ring 82 in place.

The lifting ring 84 is slidably positioned over and around the skirt ring 86 and the sleeve member 71. The two pins 85 fit into holes in the sides of the lifting ring 84. The pins 85 also pass through the holes 87 in the sides of the skirt ring 86 and extend into the notches 81. When the lifting ring 84 is moved upwardly, the pins 85 pull upwardly on the opposed portions of the locking ring 82 which in turn causes it to flatten out and unlock from the stem of cap member 75.

To insert the drill 17 into the chuck 70, the operator simply lifts upwardly the lifting ring 84. As a result of lifting the lifting ring 84, the locking ring 82 unlocks from the stem of the cap member 75 which thereby permits the operator to lift upwardly the sleeve 71. As a result of lifting the sleeve 71, the wedge members 72 permits the jaws 13 and 14 to spread apart and open in order to accept the shank 16 of the drill 17. The shank 16 is then inserted into the aperture 15 all the way until it bottoms in the upper portion of the housing 11. Then the sleeve 71 is let down by the springs 79 which provide enough force to ensure proper locking of the jaws 13 and 14 onto the shank 16 by virtue of the sloped inner surfaces 73 of the wedge member 72 acting against the sloped outer surfaces 21 and 22 of the jaws 13 and 14. The operator then lowers the lifting ring 84 which causes the locking ring 82 to resume a downward curvature which binds onto the cap member 75 thereby preventing any upward movement of the sleeve 71.

The sixth embodiment of the invention may be described by referring in detail to FIG. 9A. Some parts of the quick change tool chuck 90 (the sixth embodiment) are the same as in the first embodiment shown in FIG. 2 and the fifth embodiment shown in FIG. 9 and those parts bear the same reference numerals as in FIGS. 2 and 9. Furthermore, some of the parts which are the same as in FIG. 9 are not shown for simplicity, to-wit, the lifting ring 84, the pins 85, the skirt ring 86, and the springs 79 are not shown in FIG. 9A.

The cylindrical sleeve member 71 shown in FIG. 9A is slidably positioned over the cylindrical housing member 91. Located on the interior surface of the sleeve 71 are two diametrically opposed wedge members 72 which have the cross-sectional configuration of a right triangle as shown in FIG. 9A. The wedge members may be formed as a unit with the sleeve member 71 or they may be separate pieces attached to the interior surface of the sleeve 91 by conventional methods, such as by the screws 92.

Each of the wedge members 72 has an inner surface 73 which is sloped with respect to the axis of rotation 93 of the chuck 90. The inner surfaces 73 of the wedge members 72 may be planar as shown in FIG. 9A, or they may be a section of a cylinder. In either case, the inner surfaces 73 should complement the outer surfaces 21 and 22 of the jaw members 13 and 14. When the sleeve 71 is slidably positioned over the housing 91, the two wedge members 72 fit longitudinally inside the two slot-like longitudinal portions in the aperture 12a of the housing 91 so that the inner surfaces 73 contact the outer surfaces 21 and 22 of the jaw members 13 and 14.

The cylindrical housing member 91 fits partially inside the cylindrical sleeve member 71. The central axial aperture 95 is threaded in its upper portion to receive the spindle from a power source (not shown). Inside the housing member 91 are two longitudinal apertures which receive the two springs 79. The springs 79 are positioned to exert longitudinal force downward against the shoulder of the wedge members 72 located on the interior surface of the sleeve 71. This in turn causes the sloped inner surfaces 73 of the wedge members 72 to push against the sloped outer surfaces 21 and 22 of the jaw members 13 and 14.

The upper edge 80 of the sleeve 71 slants downwardly and inwardly and has two notches 81 formed therein. The downwardly curved locking ring 82 sits on the upper edge 80 of the sleeve 71. The locking ring 82 fits on and around the cylindrical stem 96 of the housing 91 and normally binds on the stem 96. The locking ring 82 functions in all respects the same as in the fifth embodiment shown in FIG. 8.

The quick change chuck 90 also includes the lifting ring 84, pins 85, and skirt ring 86, all shown in FIG. 9, but not shown in FIG. 9A for simplicity. The differences between the fifth embodiment shown in FIG. 9 and the sixth embodiment shown in FIG. 9A are two in number. First, the wedges 72 are removable. Second, the sixth embodiment utilizes a design in which the cylindrical cap member 75 and the housing member 11 are made as a single unit shown as housing 91 in FIG. 9A. It should be understood that the cylindrical housing member shown in FIG. 9A can be used in the other previously-described embodiments if the wedge members are made removable as shown in FIG. 9A.

To assemble the chuck 90, the jaw members 13 and 14 are placed in the housing 91 riding in the grooves 20a with the springs 33 in proper alignment as shown in FIG. 9A. Holding the jaws 13 and 14 firmly in place in the closed position, the two wedge members 72 are placed over the jaws 13 and 14. The sleeve 71 is then placed over the housing 91. The two wedge members 72 are then secured to the interior surface of the sleeve 71 using the screws 92.

The operation of the sixth embodiment shown in FIG. 9A is similar to the operation of the fifth embodiment described above in relation to FIG. 9.

The present invention also includes the special tools designed for use in the quick change tool chuck. A feature of the tools is that they are compatible with conventional jaw chucks, i.e. they may be used in conventional jaw chucks as well as in the quick change tool chuck. Thus, the tools are not limited to use in the quick change tool chuck. Each tool of the invention has a conventional work performing portion (for example, the cutting portion of a drill) and a round shank connected to the work performing portion. FIG. 9B shows the detail of the shank of a typical tool of the invention. For purposes of illustration, the shank 16 of the drill 17 is shown in an enlarged vertical section. As mentioned above, the other types of tools may also be employed such as taps, screwdrivers, end mills, routers, socket wrenches, reamers, gun drills, small grinding wheels, deburring tools, and the like.

Near the crown 69 is a defined portion of the shank having identical flat or planar surfaces 26 which are recessed in the round shank 16. As shown in FIG. 9B, the planar surfaces 26 extend from the lower shoulder 100 to the upper shoulder 101. Below the lower shoulder 100, the shank 16 is round. Above the upper shoulder 101, there is a portion 102 where the shank 16 is round again. It is necessary to have the upper shoulder 101 so that the shank will not pull out of the jaw members of the quick change tool chuck when the drill is withdrawn from the workpiece.

Each of the planar surfaces 26 is spaced an equal distance 97 from the crown 69 of the shank 16. The distance 97 may be typically about 5/32 inch. In addition, each of the planar surfaces 26 has an equal length 98. The length 98 may be typically about 5/16 inch. Thus, in each tool of the invention the distance 99 from the lower shoulder 100 to the crown 69 will be uniform, independent of the diameter of the shank 16. As mentioned before, a typical planar surface 26 may be recessed in the shank 16 at a depth of about 0.0140 to 0.0145 inch and is formed by conventional methods, such as by grinding. The preferred embodiment of the tool has four identical planar surfaces 26, equally spaced around the circumference of the shank.

The invention also includes a set of the special tools for use in the quick change tool chuck, but which may also be used in conventional jaw chucks as well. The tools in the set have a range of different shank diameters (for example, from 0.090 to 0.253 inch). Each tool in the set, regardless of its shank diameter, has a defined portion with multiple planar surfaces 26 formed therein. The planar surfaces 26 extend from the lower shoulder 100 to the upper shoulder 101. Below the lower shoulder 100, the shank 16 is round. Above the upper shoulder 101, there is a portion 102 where the shank 16 is round again.

Each tool in the set, regardless of its shank diameter, has the planar surfaces 26 axially recessed a like amount and spaced an equal distance 97 from the crown 69 of the shank 16. The typical dimensional relationships of the planar surfaces may be as stated above. As used in the quick change tool chuck of the present invention, each tool, independent of the shank diameter, will have the planar surfaces 26 in contact with the planar driving surfaces of the jaw members 13 and 14. The crown 69 of the shank 16 of the tool will be bottomed in the upper portion of the chuck housing member so that the thrust of the tool is taken by the housing member and not by the jaw members 13 and 14.

The above-described embodiments are intended to be illustrative, not restrictive. The full scope of the invention is defined by the claims, and any and all equivalents are intended to be embraced therein.

What is claimed is:

1. A quick change tool chuck which holds, centers, and drives any given tool of a set of tools having various shank diameters with each such shank diameter being uniform along the length of the shank and with each such shank having a round portion to be held and centered by the chuck, each such shank further having at least one planar portion extending parallel to the axis of rotation of the tool, to be positively driven by the chuck, with each such planar portion being recessed the same depth in each tool of the set of tools relative to the surface of the round portion thereof, said chuck comprising:

(a) two jaw means for holding, centering, and driving any given tool of the set, each of said jaw means having an inner face defined by multiple intersecting planar surfaces which are parallel to the axis of rotation of the chuck, each of said inner faces comprising a holding and centering portion including plural intersecting planar surfaces parallel to the axis of rotation of the chuck, such holding and centering portions of the jaw means functioning to hold and center any given tool of the set on the axis of rotation of the chuck by making multiple contacts with the round portion of the shank of any given tool of the set, said line contacts being parallel to the axis of rotation of the chuck, and at least one of said jaw inner faces also having a driving portion comprising at least one planar driving surface parallel to and inset toward the axis of rotation of the chuck relative to the holding and centering portion of the inner face thereof, each such planar driving surface functioning to contact and securely, nonrotatively seat the jaw means against a recessed planar portion of the shank of any given tool of the set; and (b) means for carrying said jaw means and enabling lateral movement of said jaw means with respect to the axis of rotation of the chuck, said carrying means having means for connecting the chuck to a power source;

(c) means for biasing said jaw means away from the axis of rotation of the chuck; and (d) means for urging said jaw means together into contacting relationship with the shank of a given tool.

2. The tool chuck defined in claim 1, wherein, in each of said jaw means, said intersecting planar surfaces comprising said holding and centering portion of said inner face form a right-angle groove, the walls of said groove forming two longitudinal rows of teeth.

3. A quick change tool chuck which holds, centers, and drives any given tool of a set of tools having various shank diameters with each such shank diameter being uniform along the length of the shank and with each such shank having a round portion to be held and centered by the chuck, each such shank further having at least one planar portion extending parallel to the axis of rotation of the tool, to be positively driven by the chuck, with each such planar portion being recessed the same depth in each tool of the set of tools relative to the surface of the round portion thereof, said chuck comprising:

(a) a cylindrical housing means having a lateral aperture means for receving two diametrically opposed jaw means, said housing means having a central axial aperture means for receiving the shank of any given tool of the set, said housing means having means for connecting the chuck to a power source;

(b) two jaw means for holding, centering, and driving the shank of any given tool of the set, said jaw means being diametrically opposed and laterally movable within said housing means, each of said jaw means having an outer surface which is sloped with respect to the axis of rotation of said chuck, each of said jaw means having an inner face defined by multiple intersecting planar surfaces which are parallel to the axis of rotation of the chuck, each of said inner faces comprising a holding and centering portion including plural intersecting planar surfaces parallel to the axis of rotation of the chuck, such holding and centering portions of the jaw means functioning to hold and center any given tool of the set on the axis of rotation of the chuck by making multiple line contacts with the round portion of the shank of any given tool of the set, said line contacts being parallel to the axis of rotation of the chuck, and at least one of said jaw inner faces also having a driving portion comprising at least one planar driving surface parallel to and inset toward the axis of rotation of the chuck relative to the holding and centering portion of the inner face thereof, each such planar driving surface functioning to contact and securely, nonrotatively seat the jaw means against a recessed planar portion of the shank of any given tool of the set; and (c) spring means positioned to exert lateral force to push apart said jaw means;

(d) a cylindrical sleeve means slidably positioned over said housing means, said sleeve means having two diametrically opposed wedge members positioned on the inner surface thereof, each of said wedge members having an inner surface which is sloped with respect to the axis of rotation of said chuck, the inner surface of each wedge member being at least partially in contact with the complementary outer surface of a jaw means; and (e) spring means positioned in said housing means to exert force longitudinally against said wedge members in said sleeve means to push said wedge members against said jaw means.

4. The tool chuck defined in claim 3, wherein, in each of said jaw means, said intersecting planar surfaces comprising said holding and centering portion of said inner face form a right-angle groove, the walls of said groove forming two longitudinal rows of teeth.

5. The tool chuck defined in claim 3 additionally comprising a circular locking ring means having an elliptical bore, said locking ring means being rotatably positioned on said cylindrical housing means, said locking ring means being located above said sleeve means, said housing means additionally having recessed wedge roller means to jam said locking ring means upon rotation thereof.

6. The tool chuck defined in claim 3 additionally comprising a circular locking ring means having a threaded bore, said locking ring means being rotatably positioned on said cylindrical housing means, said locking means being located above said sleeve means, said housing means additionally having a threaded stem to receive said locking ring means.

7. A quick change tool chuck which holds, centers, and drives any given tool of a set of tools having various shank diameters with each such shank diameter being uniform along the length of the shank and with each such shank having a round portion to be held and centered by the chuck, each such shank further having at least one planar portion extending parallel to the axis of rotation of the tool, to be positively driven by the chuck, with each such planar portion being recessed the same depth in each tool of the set of tools relative to the surface of the round portion thereof, said chuck comprising:

(a) a cylindrical housing means having a lateral aperture means for receiving two diametrically opposed jaws means, said housing means having a central axial aperture means for receiving the shank of any given tool of the set;

(b) two jaw means for holding, centering, and driving the shank of any given tool of the set, said jaw means being diametrically opposed and laterally movable within said housing means, each of said jaw means having an outer surface which is sloped with respect to the axis of rotation of said chuck, each of said jaw means having an inner face defined by multiple intersecting planar surfaces which are parallel to the axis of rotation of the chuck, each of said inner faces comprising a holding and centering portion including plural intersecting planar surfaces parallel to the axis of rotation of the chuck, such holding and centering portions of the jaw means functioning to hold and center any given tool of the set on the axis of rotation of the chuck by making multiple line contacts with the round portion of the shank of any given tool of the set, said line contacts being parallel to the axis of rotation of the chuck, and at least one of said jaw inner faces also having a driving portioncomprising at least one planar driving surface parallel to and inset toward the axis of rotation of the chuck relative to the holding and centering portion of the inner face thereof, each such planar driving surface functioning to contact and securely, nonrotatively seat the jaw means against a recessed planar portion of the shank of any given tool of the set; and (c) spring means positioned to exert lateral force to push apart said jaw means;

(d) a cylindrical sleeve means slidably positioned over said housing means, said sleeve means having two diametrically opposed wedge members positioned on the inner surface thereof, each of said wedge members having an inner surface which is sloped with respect to the axis of rotation of said chuck; and (e) a cylindrical cap means positioned at least partially within said sleeve means, said cap means having means for connecting the chuck to a power source, said cap means being connected to said housing means, said cap means including spring means positioned to exert force longitudinally against said wedge members in said sleeve means to push said wedge members aginst said jaw means.

8. The tool chuck defined in claim 7, wherein, in each of said jaw means, said intersecting planar surfaces comprising said holding and centering portion of said inner face form a right-angle groove, the walls of said groove forming two longitudinal rows of teeth.

9. The tool chuck defined in claim 7 additionally comprising a circular locking ring means having an elliptical bore, said locking ring means being rotatably positioned on said cylindrical cap means, said locking ring means being located above said sleeve means, said cap means additionally having recessed wedge roller means to jam said locking ring means upon rotation thereof.

10. The tool chuck defined in claim 7 additionally comprising a circular locking ring means having a threaded bore, said locking ring means being rotatably positioned on said cylindrical cap means, said locking means being located above said sleeve means, said cap means additionally having a threaded stem to receive said locking ring means.

11. A quick change tool chuck comprising:
(a) a cylindrical housing means having a lateral aperture means for receiving two diametrically opposed jaw means, said housing means having a central axial aperture means for receiving the shank of a tool;
(b) two jaw means for gripping the shank of a tool, said jaw means being diametrically opposed and laterally movable within said housing means, each of said jaw means having an outer surface which is sloped with respect to the axis of rotation of said chuck, each of said jaw means having an inner surface formed by two spaced apart pairs of intersecting planes which are parallel to the axis of rotation of said chuck, the first pair of said intersecting planes forming multiple driving surfaces for rotating the shank of a tool, the second pair of said intersecting planes forming multiple holding surfaces for clamping the shank of a tool;
(c) spring means positioned to exert lateral force to push apart said jaw means;
(d) a cylindrical sleeve means slidably positioned over said housing means, said sleeve means have two diametrically opposed wedge members positioned on the interior surface thereof, each of said wedge members having an inner surface which is sloped with respect to the axis of rotation of said chuck, the inner surface of each wedge member being at least partially in contact with the complementary outer surface of a jaw means;
(e) a cylindrical cap means positioned at least partially within said sleeve means, said cap means having means for connecting to a power source, said cap means being connected to said housing means, said cap means including spring means positioned to exert force longitudinally against said wedge members in said sleeve means to push said wedge members against said jaw means;
(f) a deformable locking ring means, said locking ring means being positioned on said cylindrical cap means, said locking ring means being located above said sleeve means, said locking ring means having an elliptical bore which binds on said cap means; and
(g) a lifting ring means being slidably positioned on said cylindrical cap means, said lifting ring means being located above said locking ring means, said lifting ring means having means to lift said locking ring means to unbind said locking ring means from said cap means.

12. The tool chuck defined in claim 11, wherein in each of said jaw means, said first pair of intersecting planes and said second pair of intersecting planes form a right-angle groove having a step therein, the walls of said groove forming two longitudinal rows of teeth.

13. A quick change tool chuck comprising:
(a) a cylindrical housing means having a lateral aperture means for receiving two diametrically opposed jaw means, said housing means having a central axial aperture means for receiving the shank of a tool;
(b) two jaw means for gripping the shank of a tool, said jaw means being diametrically opposed and laterally movable within said housing means, each of said jaw means having an outer surface which is sloped with respect to the axis of rotation of said chuck, each of said jaw means having an inner surface formed by two spaced-apart pairs of intersecting planes which are parallel to the axis of rotation of said chuck, the first pair of said intersecting planes forming multiple driving surfaces for rotating the shank of a tool, the second pair of said intersecting planes forming multiple holding surfaces for clamping the shank of a tool;
(c) spring means positioned to exert lateral force to push apart said jaw means;
(d) a cylindrical sleeve means slidably positioned over said housing means, said sleeve means have two diametrically opposed wedge members positioned on the interior surface thereof, each of said wedge members having an inner surface which is sloped with respect to the axis of rotation of said chuck, the inner surface of each wedge member being at least partially in contact with the complementary outer surface of a jaw means;
(e) a cylindrical cap means positioned at least partially within said sleeve means, said cap means having means for connecting to a power source, said cap means being connected to said housing means, said cap means including spring means positioned to exert force longitudinally against said wedge members in said sleeve means to push said wedge members against said jaw means;
(f) a deformable locking ring means, said locking ring means being positioned on said cylindrical cap means, said locking ring means being located above said sleeve means, said locking ring means having an elliptical bore which binds on said cap means; and
(g) a lifting ring means being slidably positioned over said cylindrical sleeve means and over said locking ring means, said lifting ring means having means to lift said locking ring means to unbind said locking ring means from said cap means.

14. The tool chuck defined in claim 13, wherein in each of said jaw means, said first pair of intersecting planes and said second pair of intersecting planes form a right-angle groove having a step therein, the walls of said groove forming two longitudinal rows of teeth.

15. A quick change tool chuck comprising:
(a) a cylindrical housing means having a lateral aperture means for receiving two diametrically opposed jaw means, said housing means having a central axial aperture means for receiving the shank of a tool, said housing means having means for connecting to a power source;

(b) two jaw means for gripping the shank of a tool, said jaw means being diametrically opposed and laterally movable within said housing means, each of said jaw means having an outer surface which is sloped with respect to the axis of rotation of said chuck, each of said jaw means having an inner surface formed by two spaced apart pairs of intersecting planes which are parallel to the axis of rotation of said chuck, the first pair of said intersecting planes forming multiple driving surfaces for rotating the shank of a tool, the second pair of said intersecting planes forming multiple holding surfaces for clamping the shank of a tool;

(c) spring means positioned to exert lateral force to push apart said jaw means;

(d) a cylindrical sleeve means slidably positioned over said housing means, said sleeve means having two diametrically opposed wedge members positioned on the interior surface thereof, each of said wedge members having an inner surface which is sloped with respect to the axis of rotation of said chuck, the inner surface of each wedge member being at least partially in contact with the complementary outer surface of a jaw means;

(e) spring means positioned in said housing means to exert force longitudinally against said wedge members in said sleeve means to push said wedge members against said jaw means;

(f) a deformable locking ring means, said locking ring means being positioned on said cylindrical housing means, said locking ring means being located above said sleeve means, said locking ring means having an elliptical bore which binds on said housing means; and (g) a lifting ring means being slidably positioned over said cylindrical sleeve means and over said locking ring means, said lifting ring means having means to lift said locking ring means to unbind said locking ring means from said housing means.

16. The tool chuck defined in claim 15, wherein in each of said jaw means, said first pair of intersecting planes and said second pair of intersecting planes form a right-angle groove having a step therein, the walls of said groove forming two longitudinal rows of teeth.

17. A quick change tool chuck system comprising:
(a) a quick change tool chuck which holds, centers, and drives any given tool of a set of tools having various shank diameters with each such shank diameter being uniform along the length of the shank and with each such shank having a round portion to be held and centered by the chuck, each such shank further having at least one planar portion extending parallel to the axis of rotation of the tool, to be positively driven by the chuck, with each such planar portion being recessed the same depth in each tool of the set of tools relative to the surface of the round portion thereof, said chuck comprising:
(1) two jaw means for holding, centering, and driving any given tool of the set, each of said jaw means having an inner face defined by multiple intersecting planar surfaces which are parallel to the axis of rotation of the chuck, each of said inner faces comprising a holding and centering portion including plural intersecting planar surfaces parallel to the axis of rotation of the chuck, such holding and centering portions of the jaw means functioning to hold and center any given tool of the set on the axis of rotation of the chuck by making multiple line contacts with the round portion of the shank of any given tool of the set, said line contacts being parallel to the axis of rotation of the chuck, and at least one of said jaw inner faces also having a driving portion comprising at least one planar driving surface parallel to and inset toward the axis of rotation of the chuck relative to the holding and centering portion of the inner face thereof, each such planar driving surface functioning to contact and securely, nonrotatively seat the jaw means against a recessed planar portion of the shank of any given tool of the set; and (2) means for carrying said jaw means and enabling lateral movement of said jaw means with respect to the axis of rotation of the chuck, said carrying means having means for connecting the chuck to a power source;

(3) means for biasing said jaw means away from the axis of rotation of the chuck; and (4) means for urging said jaw means together into contacting relationship with the shank of a tool; and (b) a tool held in said chuck, said tool comprising: (1) a work performing portion; and
(2) a round shank connected to said work performing portion, said shank having a defined portion with at least one planar surface recessed therein, each of said planar surfaces extending from a lower shoulder to an upper shoulder, said shank being round below said lower shoulders and round above said upper shoulders, each of said planar surfaces being spaced an equal distance from the crown of said shank, at least one of said recessed planar surfaces being in contact with at least one of said planar driving surfaces of said jaw means.

18. The tool chuck system defined in claim 17, wherein, in each of said jaw means, said intersecting planar surfaces comprising said holding and centering portion of said inner face form a right-angle groove, the walls of said groove forming two longitudinal rows of teeth.

19. A quick change tool chuck system comprising:
(a) a chuck which holds, centers, and drives any given tool of a set of tools having various shank diameters with each such shank diameter being uniform along the length of the shank and with each such shank having a round portion to be held and centered by the chuck, each such shank further having multiple identical planar surfaces extending parallel to the axis of rotation of the tool, to be positively driven by the chuck, with each such planar surface being recessed the same depth in each tool of the set of tools relative to the surface of the round portion thereof, said chuck comprising:
(1) a cylindrical housing means having a lateral aperture means for receiving two diametrically opposed jaw means, said jaw means having a central axial aperture means for receiving the shank of any given tool of the set, said housing means having means for connecting the chuck to a power source;

(2) two jaw means for holding, centering, and driving the shank of any given tool of the set, said jaw means being diametrically opposed and laterally movable within said housing means, each of said jaw means having an outer surface which is sloped with respect to the axis of rotation of said chuck, each of said jaw means having an inner face defined by multiple intersecting planar surfaces which are parallel to the axis of rotation of the chuck, each of said inner faces comprising a holding and centering portion including plural intersecting planar surfaces parallel to the axis of rotation of the chuck, such holding and centering portions of the jaw means functioning to hold and center any given tool of the set on the axis of rotation of the chuck by making multiple line contacts with the round portion of the shank of any given tool of the set, said line contacts being parallel to the axis of rotation of the chuck, and at least one of said jaw inner faces also having a driving portion comprising at least one planar driving surface parallel to and inset toward the axis of rotation of the chuck relative to the holding and centering portion of the inner face thereof, each such planar driving surface functioning to contact and securely, nonrotatively seat the jaw means against a recessed planar portion of the shank of any given tool of the set; and (3) spring means positioned to exert lateral force to push apart said jaw means;

(4) a cylindrical sleeve means slidably positioned over said housing means, said sleeve means having two diametrically opposed wedge members positioned on the interior surface thereof, each of said wedge members having an inner surface which is sloped with respect to the axis of rotation of said chuck, the inner surface of each wedge member being at least partially in contact with the complementary outer surface of a jaw member; and (5) spring means positioned in said housing means to exert force longitudinally against said wedge members in said sleeve means to push said wedge members against said jaw means; and (b) a tool held in said chuck, said tool comprising:
(1) a work poerforming portion; and
(2) a round shank connected to said work performing portion, said shank having a defined portion with multiple planar surfaces recessed the same depth therein, each of said planar surfaces extending from a lower shoulder to an upper shoulder, said shank being round below said lower shoulders and round above said upper shoulders, each of said planar surfaces being spaced an equal distance from the crown of said shank, said multiple recessed planar surfaces of said tool being in contact with said multiple planar driving surfaces of said jaw means.

20. The tool chuck system defined in claim 19, wherein, in each of said jaw means, said intersecting planar surfaces comprising said holding and centering portion of said inner face form a right-angle groove, the walls of said groove forming two longitudinal rows of teeth.

21. The quick change tool chuck system defined in claim 19 additionally comprising a circular locking ring means having an elliptical bore, said locking ring means being rotatably positioned on said cylindrical housing means, said locking ring means being located above said sleeve means, said housing means additionally having recessed wedge roller means to jam said locking ring means upon rotation therof.

22. The tool chuck system defined in claim 19 additionally comprising a circular locking ring means having a threaded bore, said locking ring means being rotatably positioned on said cylindrical housing means, said locking ring means being located above said sleeve means, said housing means additionally having a threaded stem to receive said locking ring means.

23. A quick change tool chuck system comprising:
(a) a chuck which holds, centers, and drives any given tool of a set of tools having various shank diameters which each such shank diameter being uniform along the length of the shank and with each shank having a round portion to be held and centered by the chuck, each such shank further having multiple identical planar surfaces extending parallel to the axis of rotation of the tool, to be positively driven by the chuck, with each such planar surface being recessed the same depth in each tool of the set of tools relative to the surface of the round portion thereof, said chuck comprising:
(1) a cylindrical housing means having a lateral aperture means for receiving two diametrically opposed jaw means, said jaw means having a central axial aperture means for receiving the shank of any given tool of the set;
(2) two jaw means for holding, centering, and driving the shank of any given tool of the set, said jaw means being diametrically opposed and laterally movable within said housing means, each of said jaw means having an outer surface which is sloped with respect to the axis of rotation of said chuck, each of said jaw means having an inner face defined by multiple intersecting planar surfaces which are parallel to the axis of rotation of the chuck, each of said inner faces comprising a holding and centering portion including plural intersecting planar surfaces parallel to the axis of rotation of the chuck, such holding and centering portions of the jaw means functioning to hold and center any given tool of the set on the axis of rotation of the chuck by making multiple line contacts with the round portion of the shank of any given tool of the set, said line contacts being parallel to the axis of rotation of the chuck, and at least one of said jaw inner faces also having a driving portion comprising at least one planar driving surface parallel to and inset toward the axis of rotation of the chuck relative to the holding and centering portion of the inner face thereof, each such planar driving surface functioning to contact and securely, nonrotatively seat the jaw means against a recessed planar portion of the shank of any given tool of the set; and
(3) spring means positioned to exert lateral force to push apart said jaw means;
(4) a cylindrical sleeve means slidably positioned over said housing means, said sleeve means having two diametrically opposed wedge members positioned on the interior surface thereof, each of said wedge members having an inner surface which is sloped with respect to the axis of rotation of said chuck, the inner surface of each wedge member being at least partially in contact with the complementary outer surface of a jaw member; and (5) a cylindrical cap means positioned at least partially within said sleeve means, said cap means having means for connecting the chuck to a power source, said cap means being connnected to said housing means, said cap means including spring means positioned to exert force longitudinally against said wedge members in said sleeve means to push said wedge members against said jaw means; and (b) a tool held in said chuck, said tool comprising:
(1) a work performing portion; and
(2) a round shank connected to said work performing portion, said shank having a defined portion with multiple planr surfaces recessed the same depth therein, each of said planar surfaces extending from a lower shoulder to an upper shoulder, said shank being round below said lower shoulders and round above said upper shoulders, each of said planar surface being spaced an equal distance from the crown of said shank, said multiple recessed planar surfaces of said tool being in contact with said multiple planar driving surfaces of said jaw means.

24. The tool chuck system defined in claim 23, wherein, in each of said jaw means, said intersecting planar surfaces comprising said holding and centering portion of said inner face form a right-angle groove, the walls of said groove forming two longitudinal rows of teeth.

25. The quick change tool chuck system defined in claim 23 additionally comprising a circular locking ring means having an elliptical bore, said locking ring means being rotatably positioned on said cylindrical cap means, said locking ring means being located above said sleeve means, said cap means additionally having recessed wedge roller means to jam said locking ring means upon rotation thereof.

26. The tool chuck system defined in claim 23 additionally comprising a circular locking ring means having a threaded bore, said locking ring means being rotatably positioned on said cylindrical cap means, said locking ring means being located above said sleeve means, said cap means additionally having a threaded stem to receive said locking ring means.

27. A quick change tool chuck system comprising:
(a) a chuck comprising:
(1) a cylindrical housing means having a lateral aperture means for receiving two diametrically opposed jaw means, said housing means having a central axial aperture means for receiving the shank of a tool;
(2) two jaw means for gripping the shank of a tool, said jaw means being diametrically opposed and laterally movable within said housing means, each of said jaw means having an outer surface which is sloped with respect to the axis of rotation of said chuck, each of said jaw means having an inner surface formed by two spaced apart pairs of intersecting planes which are parallel to the axis of rotation of said chuck, the first pair of said intersecting planes forming multiple driving surfaces for rotating the shank of a tool, the second pair of said intersecting planes forming multiple holding surfaces for clamping the shank of a tool;
(3) spring means positioned to exert lateral force to push apart said jaw means;
(4) a cylindrical sleeve means slidably positioned over said housing means, said sleeve means having two diametrically opposed wedge members positioned on the interior surface thereof, each of said wedge members having an inner surface which is sloped with respect to the axis of rotation of said chuck, the inner surface of each wedge member being at least partially in contact with the complementary outer surface of a jaw means;
(5) a cylindrical cap means positioned at least partially within said sleeve means, said cap means having means for connecting to a power source, said cap means being connected to said housing means, said cap means including spring means positioned to exert force longitudinally against said wedge members in said sleeve means to push said wedge members against said jaw means;
(6) a deformable locking ring means, said locking ring means being positioned on said cylindrical cap means, said locking ring means being located above said sleeve means, said locking ring means having an elliptical bore which binds on said cap means; and
(7) a lifting ring means being slidably positioned on said cylindrical cap means, said lifting ring means being located above said locking ring means, said lifting ring means having means to lift said locking ring means to unbind said locking ring means from said cap means; and (b) a tool comprising:
(1) a work performing portion; and
(2) a round shank connected to said work performing portion, said shank having a defined portion with multiple identical planar surfaces recessed therein, each of said planar surfaces extending from a lower shoulder to an upper shoulder, said shank being round below said lower shoulders and round above said upper shoulders, each of said planar surfaces being spaced an equal distance from the crown of said shank, said planar surfaces being in contact with said multiple driving surfaces of said jaw means.

28. The tool chuck system defined in claim 27, wherein in each of said jaw means, said first pair of intersecting planes and said second pair of intersecting planes form a right-angle groove having a step therein, the walls of said groove forming two longitudinal rows of teeth.

29. A quick change tool chuck system comprising:
(a) a chuck comprising:
(1) a cylindrical housing means having a lateral aperture means for receiving two diametrically opposed jaw means, said housing means having a central axial aperture means for receiving the shank of a tool;
(2) two jaw means for gripping the shank of a tool, said jaw means being diametrically opposed and laterally movable within said housing means, each of said jaw means having an outer surface which is sloped with respect to the axis of rotation of said chuck, each of said jaw means having an inner surface formed by two spaced apart pairs of intersecting planes which are parallel to the axis of rotation of said chuck, the first pair of said intersecting planes forming multiple driving surfaces for rotating the shank of a tool, the second pair of said intersecting planes forming multiple holding surfaces for clamping the shank of a tool;

(3) spring means positioned to exert lateral force to push apart said jaw means;

(4) a cylindrical sleeve means slidably positioned over said housing means, said sleeve means having two diametrically opposed wedge members positioned on the interior surface thereof, each of said wedge members having an inner surface which is sloped with respect to the axis of rotation of said chuck, the inner surface of each wedge member being at least partially in contact with the complementary outer surface of a jaw means;

(5) a cylindrical cap means positioned at least partially within said sleeve means, said cap means having means for connecting to a power source, said cap means being connected to said housing means, said cap means including spring means positioned to exert force longitudinally against said wedge members in said sleeve means to push said wedge members against said jaw members;

(6) a deformable locking ring means, said locking ring means being positioned over said cylindrical cap means, said locking ring means being located above said sleeve means, said locking ring means having an elliptical bore which binds on said cap means; and (7) a lifting ring means being slidably positioned over said cylindrical sleeve means, and over said locking ring means, said lifting ring means having means to lift said locking ring means to unbind said locking ring means from said cap means; and (b) a tool comprising:

(1) a work performing portion; and (2) a round shank connected to said work performing portion, said shank having a defined portion with multiple identical planar surfaces recessed therein, each of said planar surfaces extending from a lower shoulder to an upper shoulder, said shank being round below said lower shoulders and round above said upper shoulders, each of said planar surfaces being spaced an equal distance from the crown of said shank, said planar surfaces being in contact with said driving surfaces of said jaw means.

30. The tool chuck system defined in claim 29, wherein in each of said jaw means, said first pair of intersecting planes and said second pair of intersecting planes form a right-angle groove having a step therein, the walls of said groove forming two longitudinal rows of teeth.

31. A quick change tool chuck system comprising:

(a) a chuck comprising:

(1) a cylindrical housing means having a lateral aperture means for receiving two diametrically opposed jaw means, said housing means having a central axial aperture means for receiving the shank of a tool, said housing means having means for connecting to a power source;

(2) two jaw means for gripping the shank of a tool, said jaw means being diametrically opposed and laterally movable within said housing means, each of said jaw means having an outer surface which is sloped with respect to the axis of rotation of said chuck, each of said jaw means having an inner surface formed by two spaced apart pairs of intersecting planes which are parallel to the axis of rotation of said chuck, the first pair of said intersecting planes forming multiple driving surfaces for rotating the shank of a tool, the second pair of said intersecting planes forming multiple holding surfaces for clamping the shank of a tool;

(3) spring means positioned to exert lateral force to push apart said jaw means;

(4) a cylindrical sleeve means slidably positioned over said housing means, said sleeve means having two diametrically opposed wedge members positioned on the interior surface thereof, each of said wedge members having an inner surface which is sloped with respect to the axis of rotation of said chuck, the inner surface of each wedge member being at least partially in contact with the complementary outer surface of a jaw means;

(5) spring means positioned in said housing means to exert force longitudinally against said wedge members in said sleeve means to push said wedge members against said jaw members;

(6) a deformable locking ring means, said locking ring means being positioned on said cylindrical housing cap means, said locking ring means being located above said sleeve means, said locking ring means having an elliptical bore which binds on said housing means; and (7) a lifting ring means being slidably positioned over said cylindrical sleeve means and over said locking ring means, said lifting ring means having means to lift said locking ring means to unbind said locking ring means from said housing means; and (b) a tool comprising:

(1) as work performing portion, and (2) a round shank connected to said work performing portion, said shank having a defined portion with multiple identical planar surfaces recessed therein, each of said planar surfaces extending from a lower shoulder to an upper shoulder, said shank being round below said lower shoulders and round above said upper shoulders, each of said planar surfaces being spaced an equal distance from the crown of said shank, said planar surfaces being in contact with said multiple driving surfaces of said jaw means.

32. The tool chuck system defined in claim 31, wherein in each of said jaw means, said first pair of intersecting planes and said second pair of intersecting planes form a right-angle groove having a step therein, the walls of said groove forming two longitudinal rows of teeth.

33. In combination with any given tool of a set of tools having various shank diameters with each such shank diameter being uniform along the length of the shank and with each such shank having a round portion to be held and centered by the chuck, each such shank further having at least one planar portion extending parallel to the axis of rotation of the tool, to be positively driven by the chuck, with each such planar portion being recessed the same depth in each tool of the set of tools relative to the surface of the round portion thereof, a quick change tool chuck which holds, centers, and drives any given tool of the set of tools, said tool chuck comprising:

(a) two jaw means for holding, centering, and driving any given tool of the set, each of said jaw means having an inner face defined by multiple intersecting planar surfaces which are parallel to the axis of rotation of the chuck, each of said inner faces comprising a holding and centering portion including plural intersecting planar surfaces parallel to the axis of rotation of the chuck, such holding and centering portions of the jaw means functioning to hold and center any given tool of the set on the axis of rotation of the chuck by making multiple line contacts with the round portion of the shank of any given tool of the set, said line contacts being parallel to the axis of rotation of the chuck, and at least one of said jaw inner faces also having a driving portion comprising at least one planar driving surface parallel to and inset toward the axis of rotation of the chuck relative to the holding and centering portion of the inner face thereof, each such planar driving surface functioning to contact and securely, nonrotatively seat the jaw means against a recessed planar portion of the shank of any given tool of the set; and (b) means for carrying said jaw means and enabling lateral movement of said jaw means with respect to the axis of rotation of the chuck, said carrying means having means for connecting the chuck to a power source;

(c) means for biasing said jaw means away from the axis of rotation of the chuck; and (d) means for urging said jaw means together into contacting relationship with the shank of a given tool.

* * * * *